US007007648B2

(12) United States Patent
Fujikubo

(10) Patent No.: US 7,007,648 B2
(45) Date of Patent: Mar. 7, 2006

(54) OIL PASSAGE STRUCTURE FOR ENGINE

(75) Inventor: Makoto Fujikubo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 32 days.

(21) Appl. No.: 10/646,694

(22) Filed: Aug. 25, 2003

(65) Prior Publication Data
US 2004/0069260 A1 Apr. 15, 2004

(30) Foreign Application Priority Data
Sep. 11, 2002 (JP) .............................. 2002-266069

(51) Int. Cl.
F01M 1/06 (2006.01)
(52) U.S. Cl. .............................. 123/90.34; 123/90.27; 123/90.33
(58) Field of Classification Search ............. 123/90.15, 123/90.16, 90.17, 90.27, 90.31, 90.48–90.59; 474/110, 111, 133, 140
See application file for complete search history.

(56) References Cited

U.S. PATENT DOCUMENTS

| 3,823,698 | A | * | 7/1974 | Van Deberg | 123/90.54 |
|---|---|---|---|---|---|
| 4,117,813 | A | * | 10/1978 | Yamashita et al. | 123/119 R |
| 4,553,509 | A | * | 11/1985 | Mezger et al. | 123/90.27 |
| 4,706,620 | A | * | 11/1987 | Gill | 123/90.54 |
| 5,030,169 | A | * | 7/1991 | Kiso et al. | 474/110 |
| 5,713,809 | A | * | 2/1998 | Yamamoto et al. | 474/110 |
| 5,879,255 | A | * | 3/1999 | Yamamoto et al. | 474/110 |
| 6,280,158 | B1 | * | 8/2001 | Itoh et al. | 417/423.8 |

FOREIGN PATENT DOCUMENTS

JP 10238327 A 9/1998

\* cited by examiner

Primary Examiner—Thomas Denion
Assistant Examiner—Ching Chang
(74) Attorney, Agent, or Firm—Birch, Stewart, Kolasch & Birch, LLP

(57) ABSTRACT

To provide an oil passage structure for an engine in which a tensioner arm is in sliding-contact with a cam chain for speed-reducing a rotational power of a crankshaft by half and transmitting the resultant power to camshafts for driving an intake valve and an exhaust valve, and a screw-type lifter having a lifter rod with its one end being in contact with the tensioner arm is provided in a cylinder head, wherein the oil passage structure is intended to certainly feed oil to the screw type lifter while preventing the reduction in pressure of oil fed to the cylinder head without increasing the discharge pressure of an oil pump. An oil passage to which oil is fed from an oil pump is formed so as to extend around a cylinder head, and the downstream end of the oil passage is in communication with a screw type lifter.

16 Claims, 13 Drawing Sheets

OIL PASSAGE STRUCTURE FOR ENGINE

CROSS-REFERENCE TO RELATED APPLICATIONS

This nonprovisional application claims priority under 35 U.S.C. § 119(a) on Patent Application No. 2002-266069, filed in Japan on Sep. 11, 2002, the entirety of which is incorporated herein by reference.

BACKGROUND OF THE INVENTION

1. Field of the Invention

The present invention relates to an engine in which a tensioner arm is provided in such a manner as to be in sliding-contact with a cam chain adapted to speed-reduce the rotational power of a crankshaft by half and transmit the resultant power to camshafts for driving an intake valve and an exhaust valve. A screw type lifter having a lifter rod with one end in contact with the tensioner arm is provided in a cylinder head. In particular, the present invention relates to an improved passage structure for feeding oil to a screw type lifter.

2. Description of Background Art

Japanese Patent Laid-open No. Hei 10-238327 discloses an engine, in which oil is generally fed to a screw type lifter through an oil passage branched from a mid point of a passage, which allows oil from an oil pump to flow around a cylinder head. This passage structure; however, has a problem in that the pressure of the oil fed to the cylinder head may be reduced. Specifically, since part of oil to be fed to the cylinder head is branched to the screw type lifter, it may be difficult maintain sufficient lubricating performance required for portions to be lubricated around the camshafts, which are rotated at high speeds. To solve such a problem, it may be considered to increase the discharged pressure of the oil pump; however, in this case, the oil pump must be enlarged. This requires additional installation space for the oil pump, resulting in enlargement of the engine.

SUMMARY OF THE INVENTION

In view of the foregoing, the present invention has been made, and an object of the present invention is to provide an oil passage structure for an engine, which is capable of feeding oil to a screw type lifter while preventing a reduction in the pressure of oil fed to a cylinder head without increasing the discharge pressure of the oil pump.

To achieve the above object, according to a first aspect of the present invention, an oil passage structure for an engine includes a tensioner arm provided in such a manner as to be in sliding-contact with a cam chain adapted to speed-reduce the rotational power of a crankshaft by half and transmit the resultant power to the camshafts for driving the intake valve and the exhaust valve of the engine. A screw type lifter having a lifter rod with one end in contact with the tensioner arm is provided in a cylinder head. The oil passage structure includes an oil passage to which oil discharged from an oil pump flows. The oil passage is formed so as to extend around within the cylinder head. A downstream end of the oil passage is in communication with the screw type lifter.

With this configuration, it is possible to prevent the oil pressure flowing from the oil pump to the oil passage extending around the cylinder head from being reduced in mid-flow. Accordingly, the oil can be fed to the screw type lifter without increasing the discharge pressure of the oil pump. This is advantageous, since it avoids the necessity of enlarging the engine due to enlargement of the oil pump.

According to a second aspect of the present invention, in addition to the configuration of the first aspect of the invention, the camshafts are rotatably supported by a plurality of cam journal walls provided in the cylinder head and cam holders respectively fastened to the cam journal walls. The oil passage is formed in such a manner as to pass through sliding-contact portions between the camshafts and a specific one of the plurality of cam journal walls and a specific one of the plurality of cam holders. With this configuration, it is possible to certainly lubricate the camshafts.

According to the third aspect of the present invention, in addition to the configuration of the second aspect of the present invention, the oil passage includes a pair of annular grooves surrounding the camshafts, a communication groove for connecting the annular grooves to each other, and a pair of communication passages. The annular grooves are provided in the specific cam journal wall and the specific cam holder formed so as to rotatably support the intake side and exhaust side camshafts in common. The communication groove is provided in at least one of joining faces of the specific cam journal wall and the specific cam holder in the cylinder head. The communication passages are provided in a straight line in the specific cam journal wall in such a manner as to be in communication with the annular walls, respectively. With this configuration, it is possible to easily form passage portions of the oil passage extending around the cylinder head, which are used for lubricating the intake side and exhaust side camshafts.

According to the fourth aspect of the present invention, in addition to the configuration of the first through third aspects of the present invention, a sub-gallery for leading oil from the oil pump to the oil passage extending around the cylinder head is provided in a crankcase provided with the oil pump in such a manner as to be independent from a main-gallery for leading oil from the oil pump to portions to be lubricated at least in the crankshaft. With this configuration, it is possible to prevent the pressure of oil fed to the main gallery from being affected by the feeding of oil to the cylinder head.

Furthermore scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
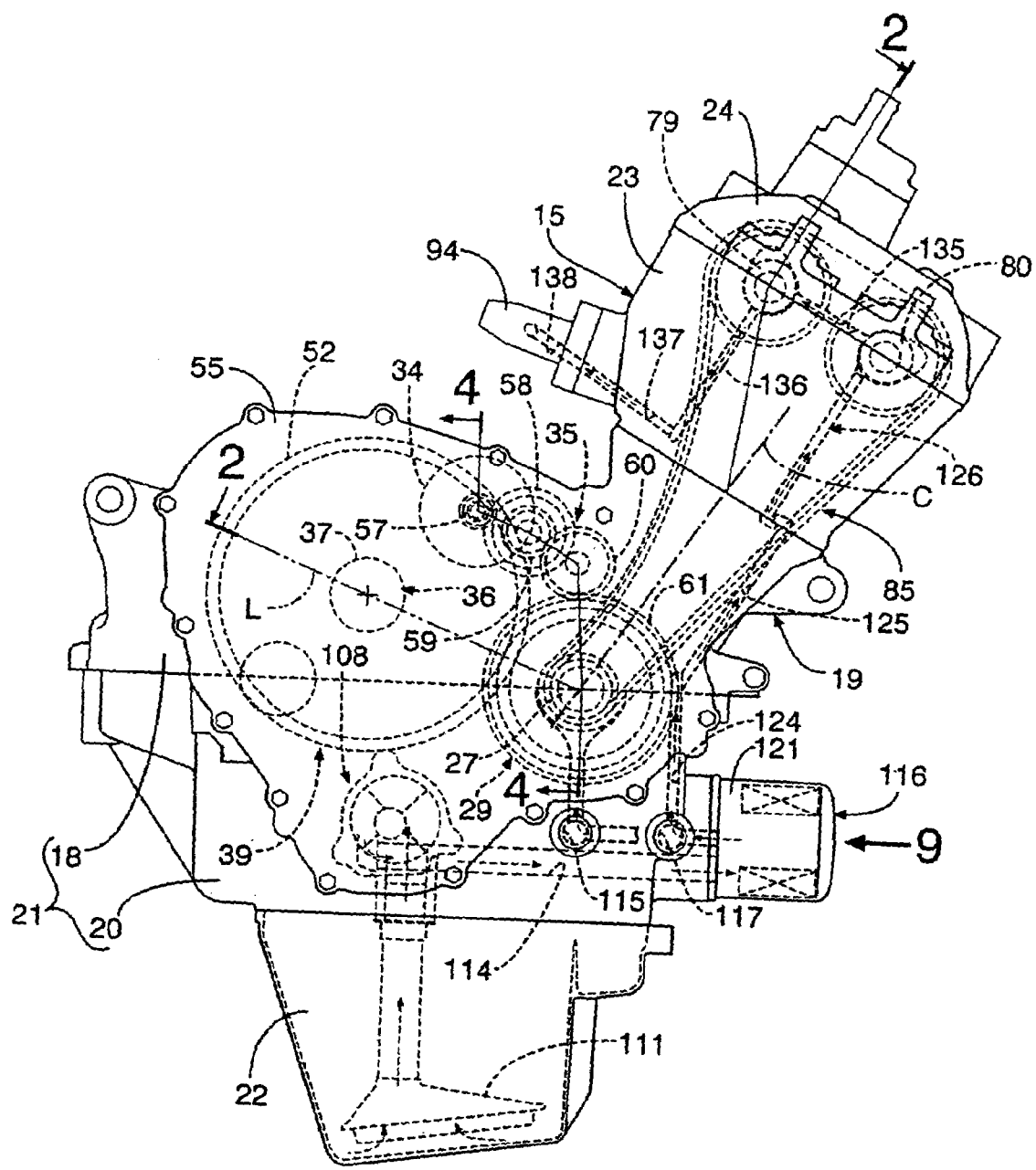
FIG. 1 is a side view of an engine.

The present invention will now be described with reference to the accompanying drawings. It should be noted that the same reference numerals have been used to identify the same or similar elements throughout the several views.

Figure 2:
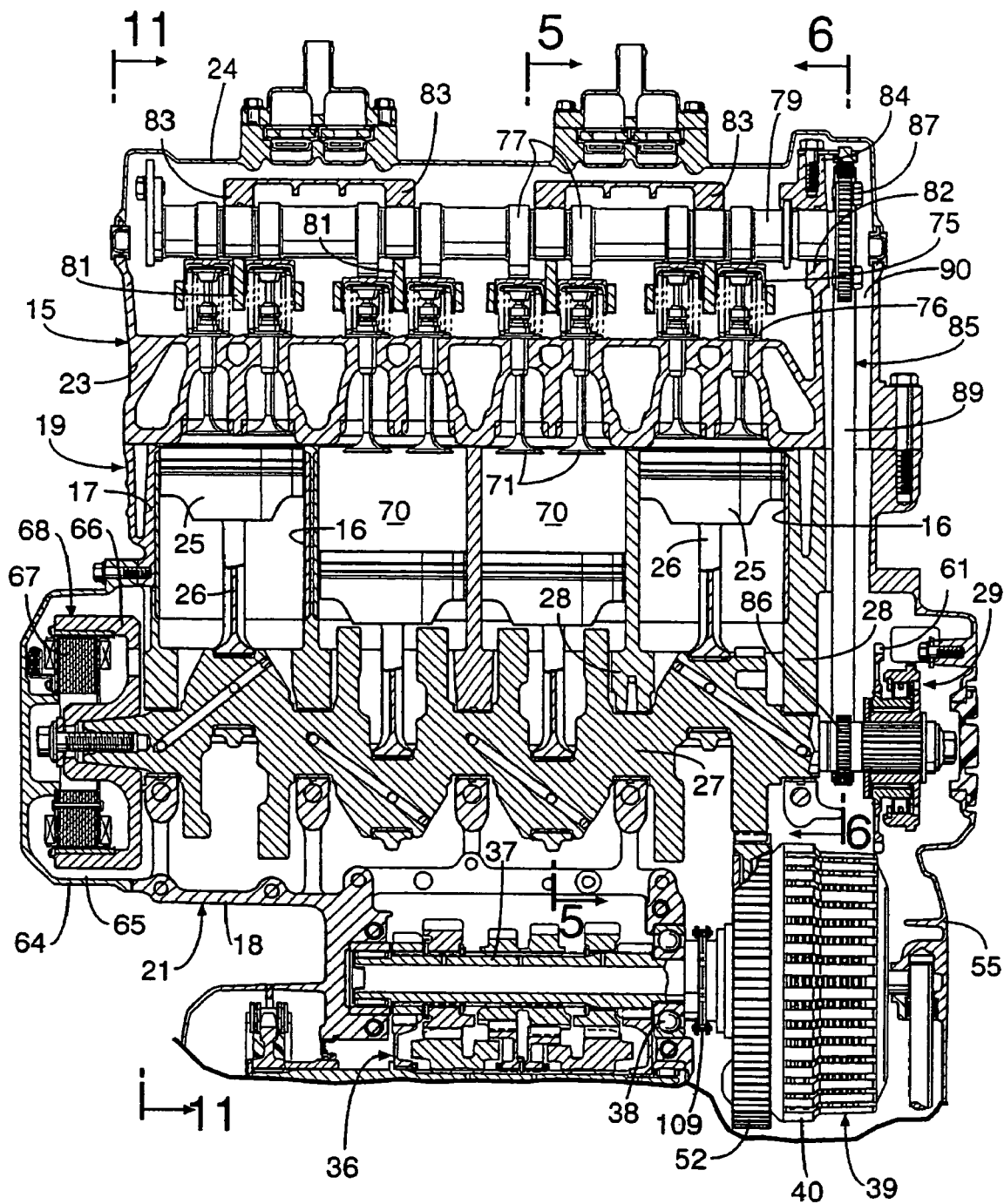
FIG. 2 is a sectional view taken on line 2—2 of FIG. 1.

Referring first to FIGS. 1 and 2, there is shown an in-line four-cylinder engine according to the present invention. Such an engine, which is typically usable on a motorcycle, includes an engine body 15 having a forwardly, upwardly tilting cylinder axis C. The engine body 15 includes a cylinder block 19, a lower case 20, an oil pan 22, a cylinder head 23, and a head cover 24. The cylinder block 19 has a cylinder portion 17 having four cylinder bores 16 arranged in line and an upper case portion 18 integrally continuous to the bottom of the cylinder portion 17. The lower case 20 is joined to the bottom of the cylinder block 19 in such a manner as to form a crankcase 21 in cooperation with the upper case portion 18. The oil pan 22 is joined to the bottom of the lower case 20, i.e., the crankcase 21. The cylinder head 23 is joined to the top of the cylinder block 19. The head cover 24 is joined to the top of the cylinder head 23.

Pistons 25 are slidably fitted in the cylinder bores 16 and are connected to a crankshaft 27 via connecting rods 26, respectively. The crankshaft 27 is supported for rotation by a plurality of crank journal walls 28 provided on the crankcase 21.

Figure 3:
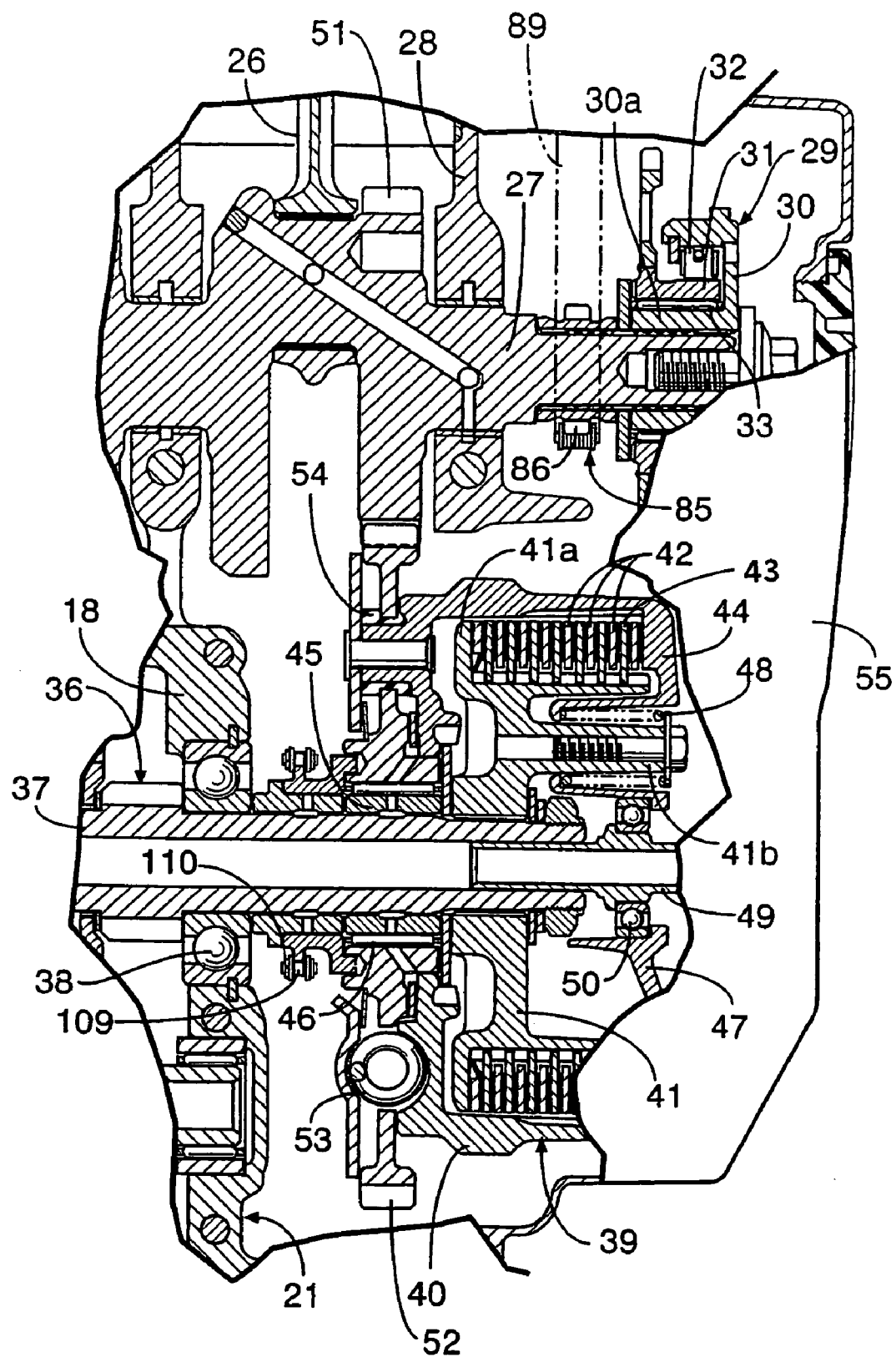
FIG. 3 is an enlarged view of an essential portion shown in FIG. 2.
Figure 4:
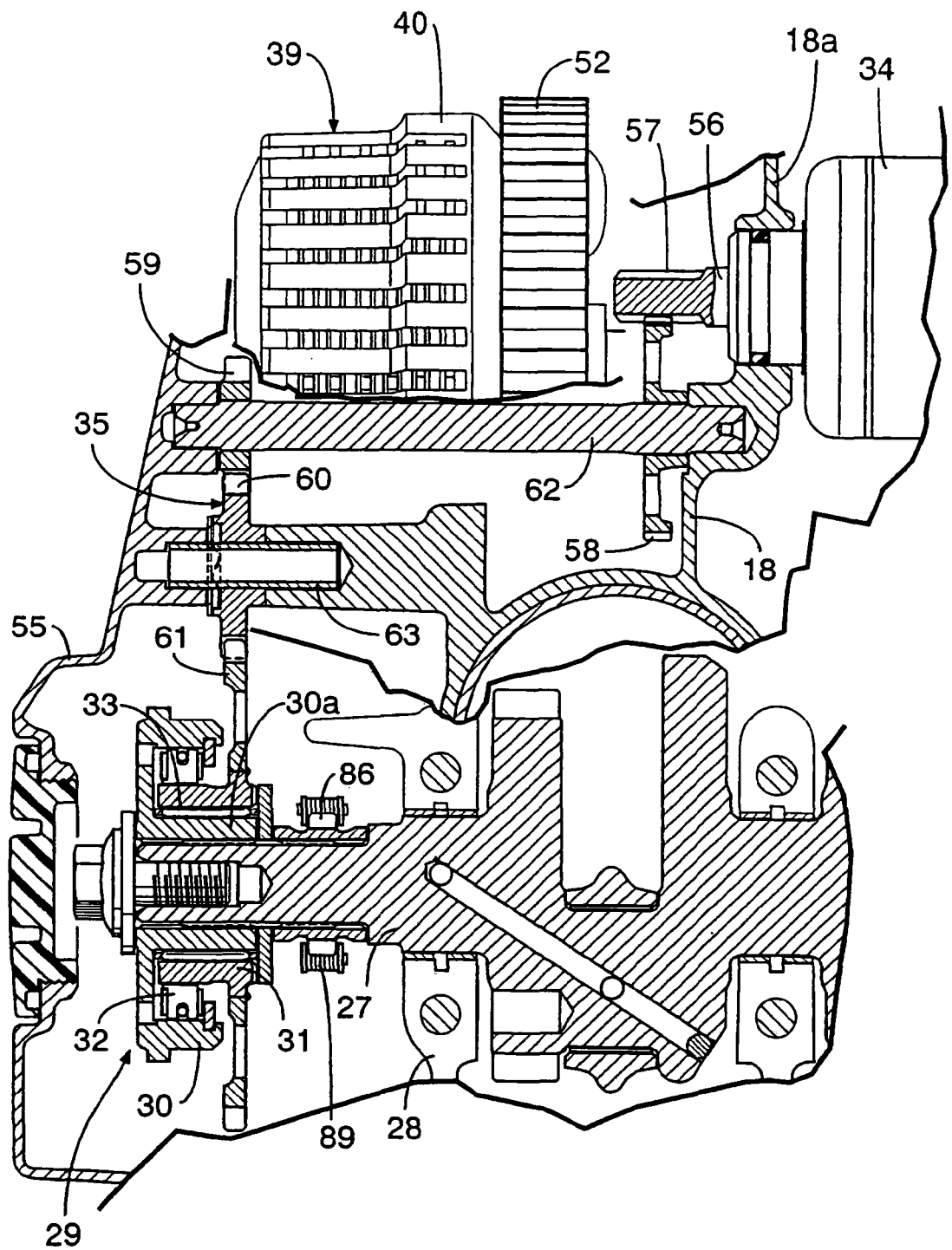
FIG. 4 is an enlarged cross-sectional view taken on line 4—4 of FIG. 1.

As particularly shown in FIGS. 3 and 4, an over-running clutch 29 is provided on one end side of the crankshaft 27 in the axial direction (or on the front end side of the motorcycle along the running direction in this embodiment). Specifically, the front end portion of the crankshaft 27 projects from the crank journal wall 28 located on the front end side, and the over-running clutch 29 is mounted to the front end portion of the crankshaft 27.

The over-running clutch 29 is of a known type including a clutch outer 30, a clutch inner 31, and a plurality of sprags interposed between the clutch outer 30 and the clutch inner 31. The clutch outer 30 has cylindrical hubs 30a fixed to one end portion of the crankshaft 27. The clutch inner 31 is relatively rotatably supported by a needle bearing 33 interposed between the hub 30a and the clutch inner 31. When the clutch inner 31 is normally rotated, the sprags 32 are raised to connect the clutch inner 31 to the clutch outer 30.

A starting motor 34 is mounted to the upper case portion 18 of the crankcase 21 of the engine body 15. The over-running clutch 29 having a rotational axis parallel to that of the crankshaft 27 is adapted to input rotational power of the starting motor 34 to the crankshaft 27. A starting gear reducer 35 is provided between the starting motor 34 and the over-running clutch 29.

Power outputted from the crankshaft 27 is speed-reduced by a transmission 36, and is transmitted to a rear wheel as a drive wheel. A main shaft 37 of the transmission 36, which has an axis parallel to that of the crankshaft 27, is supported for rotation by the upper case portion 18 of the crankcase 21 via a ball bearing 38 or the like.

A starting clutch 39 interposed between the crankshaft 27 and the main shaft 37 is mounted to one end of the main shaft 37. The starting clutch 39 includes a clutch housing 40, a clutch center 41, a plurality of friction plates 42, a plurality of friction plates 43, and a pressing plate 44. The clutch housing 40 is relatively rotatably supported by the main shaft 37. The clutch housing 40 is formed into a cylindrical shape with a closed bottom. The clutch center 41 is coaxially contained in the clutch housing 40 in such a manner as to be fixed to the main shaft 37. The friction plates 42 are spline-fitted in the inner periphery of the clutch housing 40. The friction plates 43 are axially slidably fitted in the outer periphery of the clutch center 41 in such a manner as to be alternately overlapped with the friction plates 42. The pressing plate 44 is provided for pressing the friction plates 42 and 43 toward a pressure receiving plate 41a provided on the clutch center 41.

The clutch housing 40 is supported for rotation by a cylindrical sleeve 45 mounted to the main shaft 37 via a needle bearing 46. The clutch housing 40 is thus rotatable relative to the main shaft 37. The pressing plate 44 is integrally formed on a release plate 47. A plurality of supporting shafts 41b passing through the release plate 47 are integrally provided on the clutch center 41. Coil-shaped clutch springs 48, each surrounding the corresponding supporting shaft 41b, are interposed between the release plate 47 and the clutch center 41. The release plate 47 is supported for rotation by a release rod 49 via a release bearing 50. The release rod 49 is inserted in the main shaft 37 in such a manner as to be axially movable relative to the main shaft 37.

In response to axial movement of the release rod 49, the starting clutch 39 switches the states of connection and disconnection between the clutch housing 40 and the clutch center 41 to each other. In the connection state, the friction plates 42 and 43 are pressed between the pressure receiving plate 41a and the pressing plate 44, to connect the clutch center 41 to the clutch housing 40. In the disconnection state, the friction plates 42 and 43 are free between the pressure receiving plate 41a and the pressing plate 44, to disconnect the clutch center 41 from the clutch housing 40.

A drive gear 51 is integrally formed on the crankshaft 27 at a position located inside the above-described crank journal wall 28 on one end side of the crankshaft 27. A driven gear 52 meshing with the drive gear 51 is connected to the clutch housing 40 of the starting clutch 39 via a damper spring 53 and an elastic member 54.

When the starting clutch 39 switches the disconnection state to the connection state, power from the crankshaft 27 is transmitted to the main shaft 37 via the drive gear 51, driven gear 52 and the starting clutch 39.

The over-running clutch 29 and the starting clutch 39 are located at positions projecting from side walls of the cylinder block 19 and the lower case 20 (on the right side wall of the motorcycle along the running direction in this embodiment) on one end side of the crankshaft 27 in the axial direction. A cover 55 for covering the over-running clutch 29 and the starting clutch 39 is fastened to the side walls of the cylinder block 19 and the lower case 20.

A supporting wall 18a is provided on the upper case portion 18 of the crankcase 21 in such a manner as to be located at a position corresponding to an approximately central portion of the engine body 15 along the axis of the crankshaft 27. The starting motor 34 is mounted to the supporting wall 18a. In this case, on the figure projected on a plane perpendicular to the axis of the crankshaft 27, the starting motor 34 is disposed within a region surrounded by the cylinder axis C and a straight line L connecting the axis of the crankshaft 27 and the axis of the main shaft 37 to each other. Furthermore, on the side view of one end side of the crankshaft 27 in the axial direction, the starting motor 34 is disposed behind the starting clutch 39 in such a manner that part of the starting motor 34 overlaps with the starting clutch 39.

In other words, the starting motor 34 is disposed at an approximately central portion of the engine body 15 along the axis of the crankshaft 27 in such a manner as to sandwich the starting clutch 39 between the over-running clutch 29 and the starting motor 34 in the direction along the axis of the crankshaft 27.

The starting gear reducer 35 includes a pinion 57, a large-diameter gear 58, a small-diameter gear 59, an idle gear 60, and a ring gear 61. The pinion 57 is fixed to an output shaft 56 of the starting motor 34. The large-diameter gear 58 is meshed with the pinion 57. The small-diameter gear 59 rotates integrally with the large-diameter gear 58. The idle gear 60 meshes with the small-diameter gear 59. The ring gear 61 is fixed to the clutch inner 31 of the over-running clutch 29 in such a manner as to mesh with the idle gear 60. An output of the starting motor 34 is speed-reduced in three steps, i.e., by a first reduction step between the pinion 57 and the large-diameter gear 58, a second reduction step between the small-diameter gear 59 and the idle gear 60, and a third reduction step between the idle gear 60 and the ring gear 61. The output of the starting motor 34 is then transmitted to the crankshaft 27 via the over-running clutch 29.

A rotational shaft 62 is supported for rotation by the supporting wall 18a and the cover 55. The rotational shaft 62 crosses the starting clutch 39. The large-diameter gear 58 and the small-diameter gear 59 are fixed to opposite ends of the rotational shaft 62, respectively. The idle gear 60 is supported for rotation by a supporting shaft 63, which is supported by the upper case portion 18 and the cover 55.

As shown in FIG. 2, a generator chamber 65 is formed by a side wall of the cylinder block 19 on the opposite side of the crankshaft 27 in the axial direction and a generator cover 64 fastened to the cylinder block 19. The other end portion of the crankshaft 27 projects into the generator chamber 65. In the generator chamber 65, a rotor 66 is fixed to the other end portion of the crankshaft 27. A stator 67 surrounded by the rotor 66 is fixed to the inner surface of the generator cover 64. The rotor 66 and the stator 67 form a generator 68.

Figure 5:
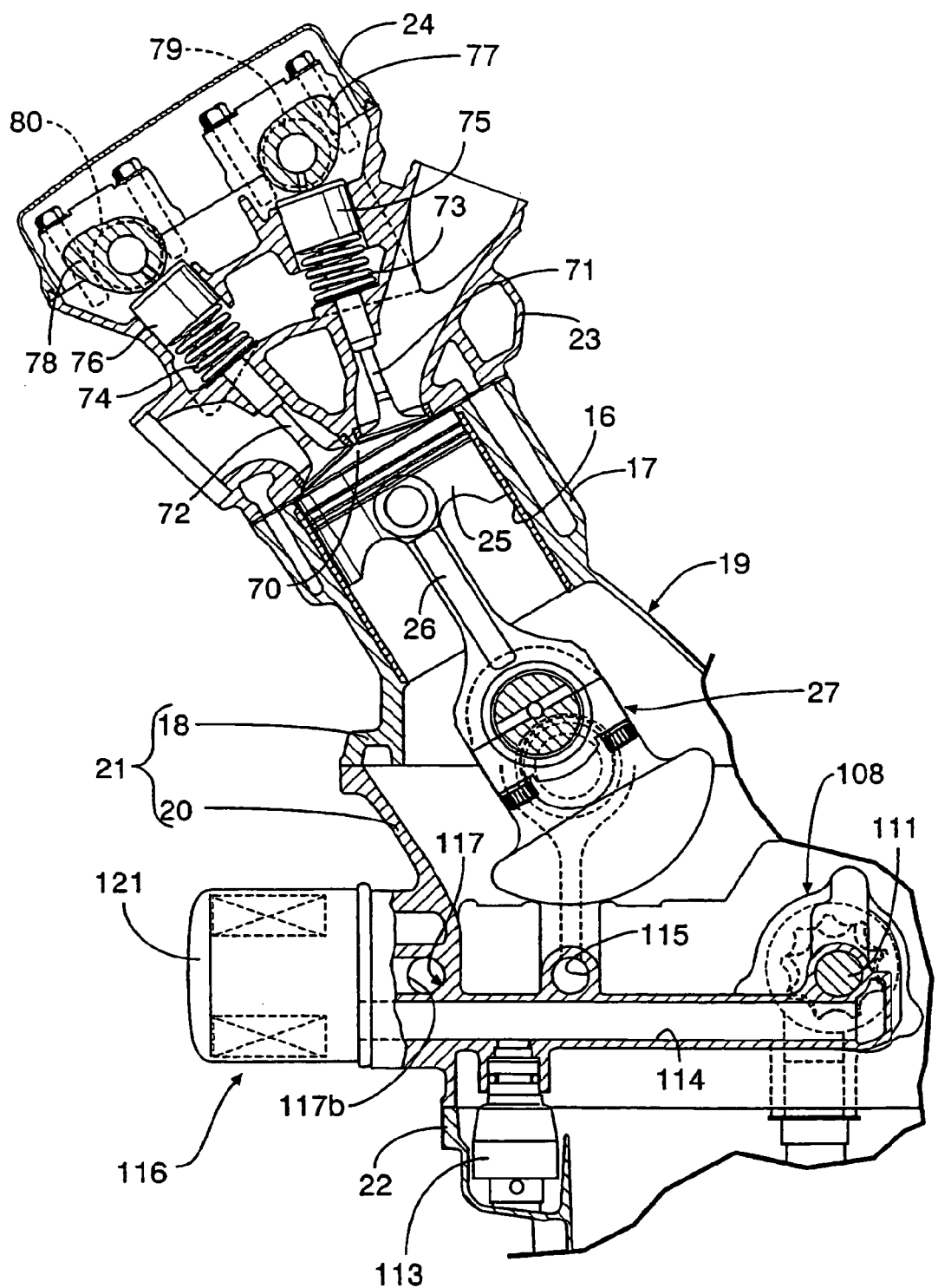
FIG. 5 is an enlarged cross-sectional view taken on line 5—5 of FIG. 2.

As particularly shown in FIG. 5, combustion chambers 70 are formed between the cylinder portion 17 of the cylinder block 19 and the cylinder head 23. The combustion chambers 70 face the top of the corresponding piston 25 faces. Intake valves 71 and exhaust valves 72 are openably/closably mounted in the cylinder head 23 in such a manner that a pair of the intake valve 71 and exhaust valve 72 are disposed for each of the combustion chambers 70. The intake valves 71 and the exhaust valves 72 are biased in the valve closing direction by the spring force of valve springs 73 and 74, respectively.

Each lifter 75 is in contact with the top of the corresponding intake valve 71 and is fitted in the cylinder head 23 in such a manner as to be slidable in the direction along the valve opening/closing direction, i.e., the axial direction of the intake valve 71. Similarly, each lifter 76 is in contact with the top of the corresponding exhaust valve 72 and is fitted in the cylinder head 23 in such a manner as to be slidable in the direction along the valve opening/closing direction, i.e., the axial direction of the exhaust valve 72.

An intake side cam 77 is in sliding-contact with the upper surface, opposite to the intake valve 71, of the corresponding lifter 75. An exhaust side cam 78 is in sliding-contact with the upper surface, opposite to the exhaust valve 72, of the corresponding lifter 76. The intake side cams 77 are integrally provided on an intake side camshaft 79, and the exhaust side cams 78 are integrally provided on an exhaust side camshaft 80.

Cam journal walls 81 are integrally provided in the cylinder head 23. Each of the cam journal walls is common to the intake side camshaft 79 and the exhaust side camshaft 80 and is disposed at a position corresponding to that of each combustion chamber 70. Similarly, a cam journal wall 82 is integrally provided in the cylinder head 23. The cam journal wall 8s is common to the intake side camshaft 79 and the exhaust side camshaft 80 and is located on one end side of the camshafts 79 and 80 along the axial direction. Four cam holders 83 are fasten to the cam journal walls 81. Each of the cam holders 83 is common to the intake side camshaft 79 and the exhaust side camshaft 80. A cam holder 84, which is common to the intake side camshaft 79 and the exhaust side camshaft 80, is fastened to the cam journal wall 82. The intake side camshaft 79 and the exhaust camshaft 80 are rotatably supported by the cam holders 83 and 84 and the cam journal walls 81 and 82. In addition, each pair of the cam holders 83 are integral with each other.

Figure 6:
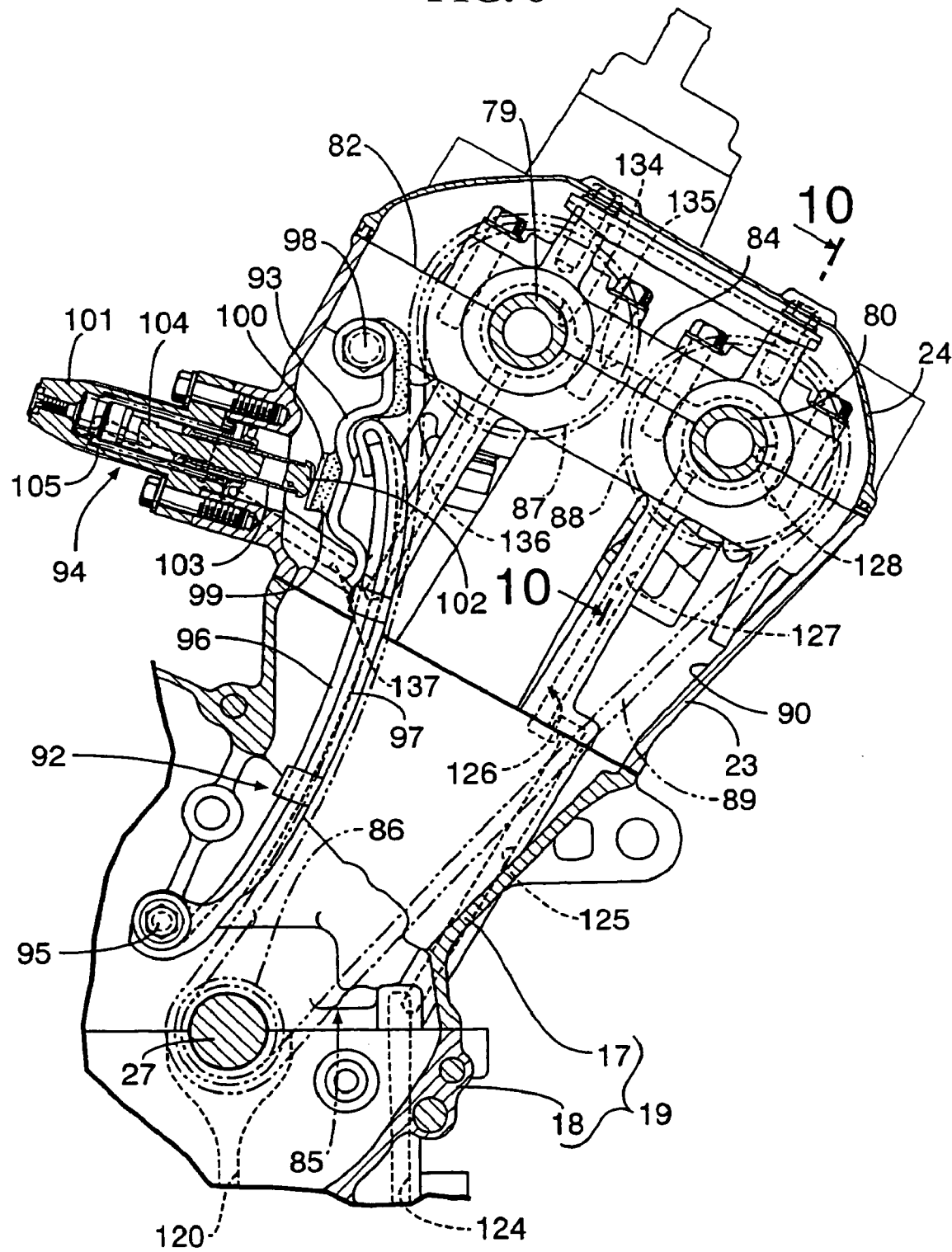
FIG. 6 is an enlarged cross-sectional view taken on line 6—6 of FIG. 2.

As particularly shown in FIG. 6, a timing transmission 85 is provided for speed-reducing rotational power of the crankshaft 27 by half and transmitting the resultant rotational power to the intake side camshaft 79 and the exhaust side camshaft 80.

The timing transmission 85 includes a drive sprocket 86, a driven sprocket 87, a driven sprocket 88, and an endless cam chain 89. The drive sprocket 86 is fixed to the crankshaft 27 at a position between the crank journal wall 28 on one end side of the crankshaft 27 in the axial direction and the over-running clutch 29. The driven sprocket 87 is fixed to one end of the intake side camshaft 79. The driven sprocket 88 is fixed to one end of the exhaust side camshaft 80. The endless cam chain 89 is wound around the sprockets 86, 87, and 88. The drive sprocket 86 and a lower portion of the cam chain 89 are contained between the cylinder block 19 and the cover 55. An upper portion of the cam chain 89 is contained in a runnable manner in a cam chain chamber 90 provided in the cylinder head 23.

A chain tensioner 91 is provided for giving a constant tension to a portion, on the loosened side, i.e., on the side between the drive sprocket 86 and the driven sprocket 87, of the cam chain 89. The chain tensioner 91 includes a tensioner arm 92, a control arm 93, and a tensioner lifter 94.

The tensioner arm 92 includes a tensioner arm body 96 and a shoe 97 made from a synthetic resin. The tensioner arm body 96 is swingably supported by the cylinder block 19 via a first pivot 95 located in the vicinity of the drive sprocket 86. The shoe 97 is mounted to the tensioner arm body 96 in such a manner as to be in sliding-contact with the outer surface of the portion of the cam chain 89 located on the loose side thereof. The tensioner arm body 96 is made from spring steel in the form of a strip arched to the outer surface of the portion of the cam chain 89 located on the loosened side thereof. The shoe 97 is formed so as to cover the front surface of the tensioner arm body 96.

Similar to the tensioner arm body 96, the control arm 93 is made from spring steel. The base end of the control arm 93 is swingably supported by the cylinder head 23 via a second pivot 98 located in the vicinity of the driven sprocket 87. The swingable end of the control arm 93 comes into contact with the back surface of the swingable end of the tensioner arm body 96. A pressure receiving plate 100 is joined to the back surface of an intermediate portion of the control arm 93 via a cushion material such as rubber. The tensioner lifter 94 is mounted to the cylinder head 23 in such a manner as to bias the pressure receiving plate 100 toward the tensioner arm 92.

Figure 7:
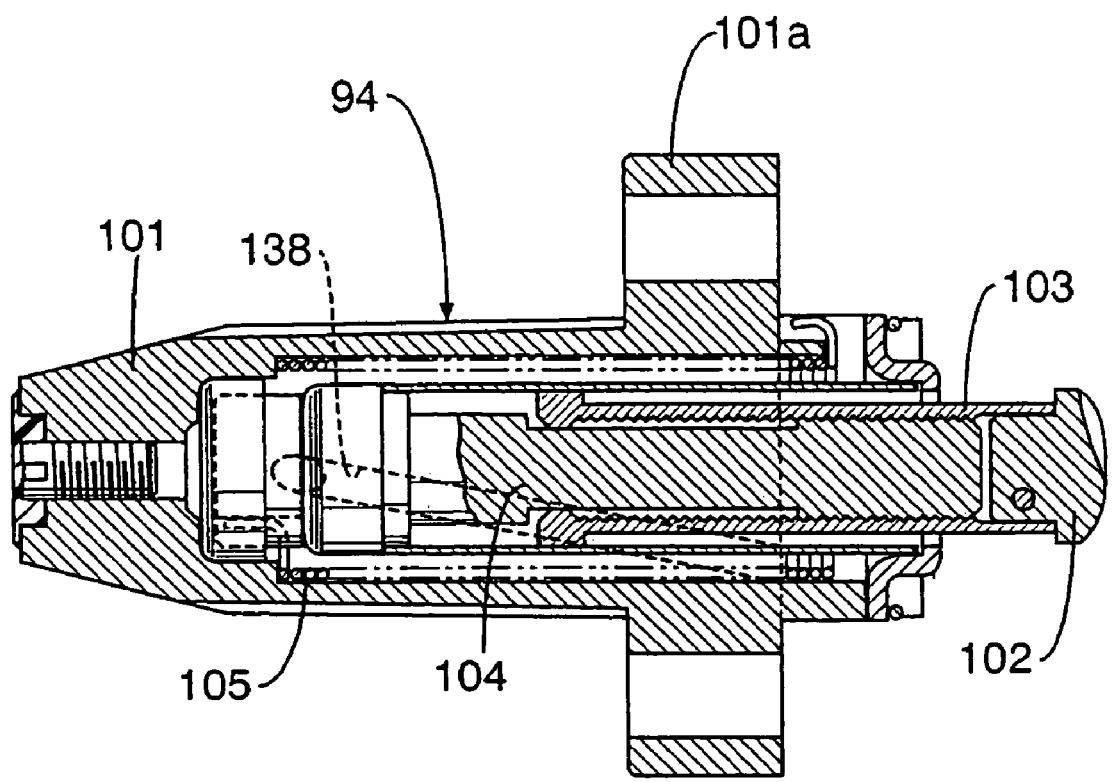
FIG. 7 is an enlarged longitudinal cross-sectional view of a screw type lifter.

As shown in FIG. 7, the tensioner lifter 94 is of a known type including a lifter case 101, a hollow lifter rod 103, a screw shaft 104, and a torsional coil spring 105. The lifter case 101 has a flange 101*a* fastened to the cylinder head 23. The lifter rod 103 has at its leading end a pressing portion 102 adapted to be brought into contact with the pressure receiving plate 100. The lifter rod 103 is supported in the lifter case 101 in a rotationally fixed manner. The screw shaft 104 is screwed in the hollow portion of the lifter rod 103. The tortional coil spring 105 spirally biases the screw shaft 104 in the lifter case 101 in the advance direction of the lifter rod 103.

In the tensioner lifter 94, a tortional force of the tortional coil spring 105 is converted and amplified into a thrust load by the screw shaft 104. The thrust load biases the lifter rod 103 toward the control arm 93.

An oil pump 108 having a rotational axis parallel to that of the crankshaft 27 is mounted to the lower case 20 of the crankcase 21. An endless chain 110 is wound around a sprocket 109 relatively unrotatably engaged with the clutch housing 40 of the starting clutch 39 and a sprocket (not shown) fixed to a rotational shaft 111 of the oil pump 108.

Figure 8:
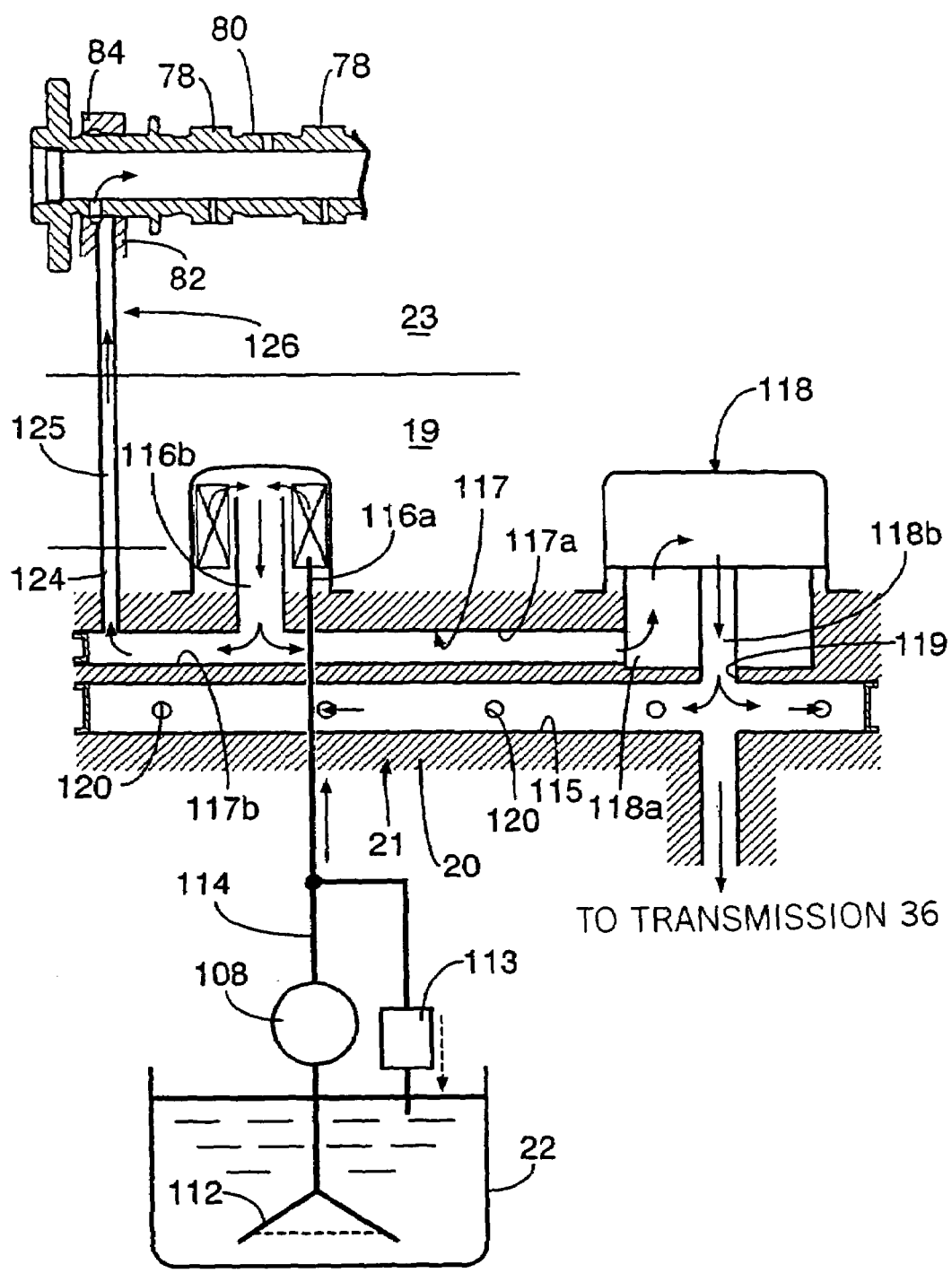
FIG. 8 is a diagram illustrating oil feeding lines from an oil pump to a main gallery and a sub-gallery.

As particularly shown in FIG. 8, oil in the oil pan 22 is pumped up by an oil pump 108 via an oil strainer 112, and is discharged from the oil pump 108 to a discharge passage 114 provided in the lower case 20. A relief valve 113 is interposed between the discharge passage 114 and the oil pan 22, to keep the oil pressure in the discharge passage 114 at a constant value.

Oil is fed from a main gallery 115 to portions to be lubricated between the crank journal walls 18 and the crankshaft 27 and to the transmission 36. The main gallery 115 is provided in the lower case 20 of the crankcase 21. Specifically, the main gallery 115 is connected to a discharge port of the oil pump 108 via an oil filter 116 and an oil cooler 118. Passages 120 for leading oil to the portions to be lubricated between the crank journal walls 18 and the crankshaft 27 are provided in the lower case 20 in such a manner as to be in communication with the main gallery 115.

A sub-gallery 117 for leading oil toward the cylinder head 23 is provided in the lower case 20 of the crankcase 21. The sub-gallery 117 is connected to an outlet 116*b* of the oil filter 116 in parallel to the main gallery 115.

The sub-gallery 117 is composed of a first passage portion 117*a* and a second passage portion 117*b*. The first passage portion 117*a* extends in a straight line so as to communicate the outlet 116*b* of the oil filter 116 to the oil cooler 118. The second passage portion 117*b* extends in a straight line in a direction reverse to that of the first passage portion 117*a*. The discharge port 114 is connected to an inlet 116*a* of the oil filter 116. Oil is fed in the oil cooler 118 through the first passage portion 117*a* in communication with the outlet 116*b* of the oil filter 116, and is led to the main gallery 115 via a communication passage 119. The communication passage 119 is provided in the lower case 20 in such a manner as to be coaxially in communication with an outlet 118*b* provided at a center portion of oil cooler 118.

The sub-gallery 117 and the main gallery 115 in communication with the outlet 118*b* of the oil cooler 118 are provided in the lower case 20 of the crankcase 21 in such a manner that the axis of each of the sub-gallery 117 and the main gallery 115 is parallel to that of the crankshaft 27. The discharge passage 114 is disposed under both the main gallery 115 and the sub-gallery 117 in such a manner that the axis thereof is perpendicular to the main gallery 115 and the sub-gallery 117.

The center line of the sub-gallery 117, the center line of the main gallery 115, the center line of the communication passage 119, and the center axes of the oil filter 116 and the oil cooler 118 are all located within the same plane.

Figure 9:
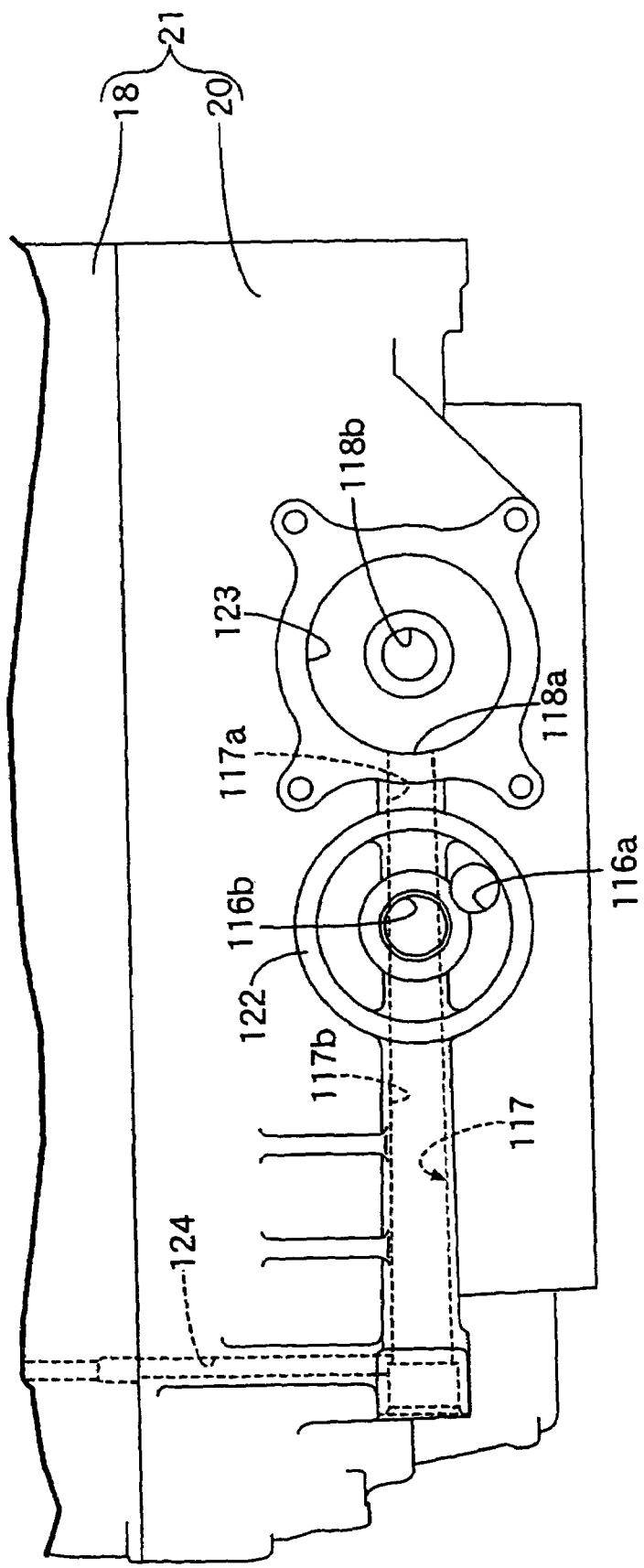
FIG. 9 is a view of a crankcase, seen in the direction of arrow 9 of FIG. 1.

As shown in FIG. 9, the oil filter 116 and the oil cooler 118 are mounted to an outer wall surface of the crankcase 21, more specifically, on an outer wall surface of a front portion of the lower case 20 along the running direction of the motorcycle in this embodiment.

A circular mounting seat 122, to which a housing 121 of the oil filter 116 is to be mounted, is provided on the outer wall surface of the lower case 20 of the crankcase 21. A circular outlet 116*b* in communication with the sub-gallery 117 is provided at a center portion of the mounting seat 122. An inlet 116*a* in communication with the discharge passage 114 is provided in the mounting seat 122 at a position eccentric from the outlet 116*b*.

A circular recess 123, in which part of a housing (not shown) of the oil cooler 118 is to be fitted, is provided in the outer wall surface of the lower case 20 at a position adjacent to the mounting seat 122. The first passage portion 117*a* of the sub-gallery 117 is opened in the inner side surface of the circular recess 123. The open portion is taken as an inlet 118*a* of the oil cooler 118. The outlet 118*b* is opened in a central portion of the circular recess 123. The outlet 118*b* is in communication with the main gallery 115 via the communication passage 119.

An oil passage 124 extending upwardly from one end of the sub-gallery 117 is provided in the crankcase 21 on one end side of the crankshaft 27 along the axial direction. The oil passage 124 is in communication with an oil passage 126 extending around the cylinder head 23 via an oil passage 125 provided in the cylinder portion 17 of the cylinder block 19.

The oil passage 126 extending around the cylinder head 23 includes a communication passage 127. The communication passage 127 is provided in a specific one of the plurality of the cam journal walls 81 and 82 provided in the cylinder head 23. The above specific cam journal wall is the cam journal wall 82 on one end side of the crankshaft 27 in the axial direction. The communication passage 127 extends in a straight line so as to be in communication with the oil passage 125 provided in the cylinder portion 17.

Figure 10:
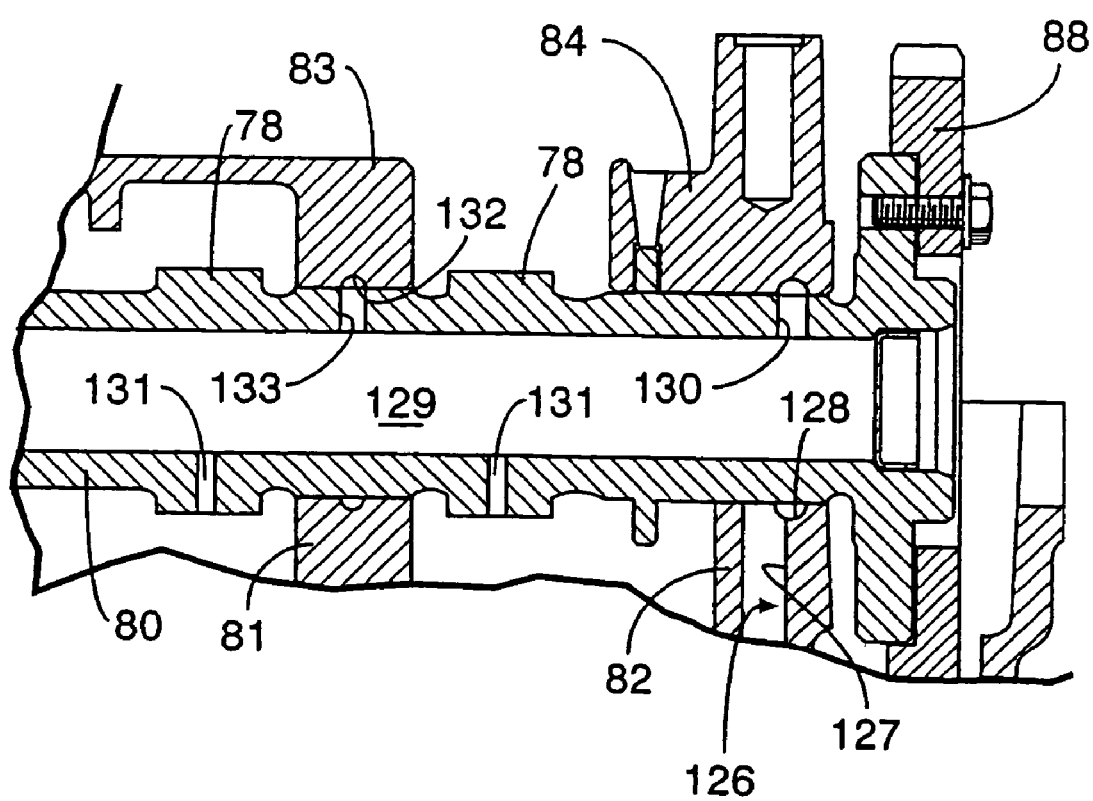
FIG. 10 is a cross-sectional view taken on line 10—10 of FIG. 6.

As shown in FIG. 10, an annular groove 128 surrounding the exhaust side camshaft 80 is provided in both the cam journal wall 82 and the cam holder 84 fastened to the cam journal wall 82. The upper end of the above-described communication passage 127 is opened in the annular groove 128. A lubricating oil passage 129 closed at both ends of the exhaust side camshaft 80 is coaxially provided in the exhaust side camshaft 80. A communication hole 130 for communicating the annular groove 128 to the lubricating oil passage 129 is provided in the exhaust side camshaft 80. Lubricating oil holes 131, which have outer ends opened in side surfaces of respective exhaust side cams 78 and the inner ends in communication with the lubricating oil passage 129, are provided in the exhaust side camshaft 80. Annular grooves 132 surrounding the exhaust side camshaft 80 are provided in the other cam journal walls 81 and the other cam holders 83. Communication holes 133 for communicating the lubricating oil passage 129 to the annular grooves 132 are provided in the exhaust side camshaft 80.

Oil led from the sub-gallery 117 is thus fed in the lubricating oil passage 129 provided in the exhaust side camshaft 80. The oil is then fed from the lubricating oil passage 129 to sliding-contact portions between the exhaust side cams 78 and the lifters 76 and sliding-contact portions between the exhaust side camshaft 80 and the cam journal walls 81 and 82 and the cam holders 83 and 84.

The oil passage 126 extending around the cylinder head 23 passes through the sliding-contact portions between the intake side camshaft 79 and the exhaust side camshaft 80 and the cam journal wall 82 and the cam holder 84. It is to be noted that the cam journal wall 82 is the specific one of the plurality of cam journal walls 81 and 82 and the cam holder 84 is the specific one of the plurality of cam holders 83 and 84. The above-described annular groove 128 provided in the cam journal wall 82 and the cam holder 84 in such a manner as to surround the exhaust side camshaft 80 is in communication with an annular groove 134 provided in the cam journal wall 82 and the cam holder 84 in such a manner as to surround the intake side camshaft 79 by means of a communication groove 135 provided in at least one of the connection faces of the cam journal wall 82 and the cam holder 84 in the cylinder head 23 (the connection face of the cam holder 84 in this embodiment). A communication passage 136 in communication with the annular groove 134 is provided in a straight line in the cam journal wall 82 in such a manner as to extend in parallel to the communication passage 127.

The lubrication for the intake side camshaft 79 side is performed by the same lubricating structure as that of the exhaust side camshaft 80. Oil led from the annular groove 134 into the intake side camshaft 79 is fed to the sliding-contact portions between the intake side cams 77 and the lifters 75 and the sliding-contact portions between the intake side camshaft 79 and the cam journal walls 81 and 82 and the cam holders 83 and 84.

The oil passage 126 extending around the cylinder head 23 includes a communication passage 137 provided in the cylinder head 23 in such a manner that one end of communication passage 137 is in communication with the communication passage 136. The other end of communication passage 137 is in communication with a passage 138 provided in the lifter housing 101 of the screw type lifter 94. The passage 138 is opened in the lifter housing 101. In this way, the downward end of the oil passage 126 extending around the cylinder head 23 is in communication with the screw type lifter 94.

Figure 11:
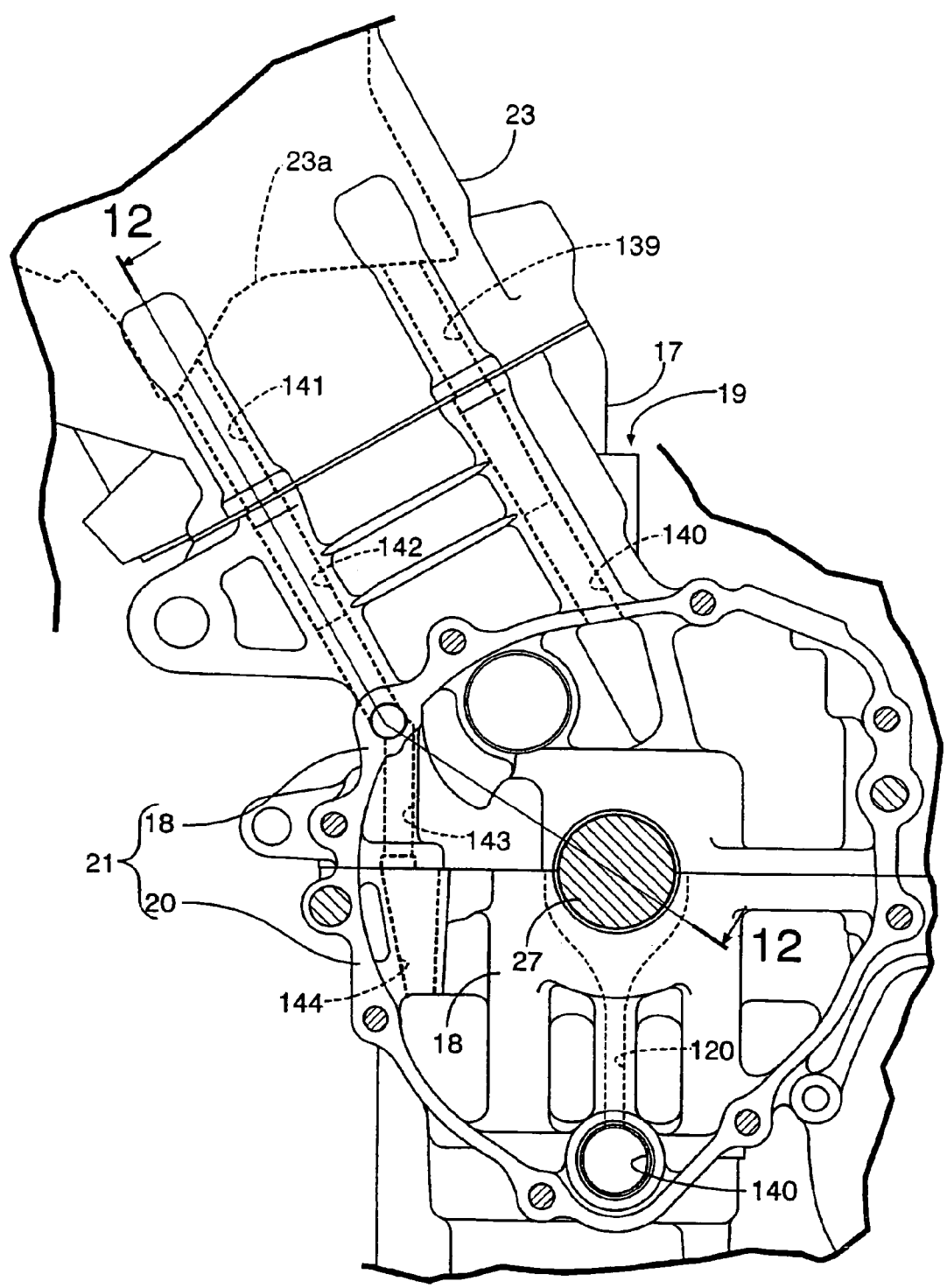
FIG. 11 is a cross-sectional view taken on line 11—11 of FIG. 2.

Oil fed through the oil passage 126 extending around the cylinder head 23 is returned from the cylinder head 23 to the oil pan 22. As shown in FIG. 11, an upper surface 23a of the cylinder head 23 is formed into a triangular shape projecting upwardly in order to separate oil into the intake side camshaft 79 side and the exhaust side camshaft 80 side.

The oil having flown on the intake side camshaft 79 side is returned to the oil pan 22 through oil passages 139 and 140. The oil passages 139 and 140 are provided in the cylinder head 23 and the cylinder block 19 in such a manner as to be coaxial with each other. On the other side, the oil having flown on the exhaust side camshaft 80 side is returned to the oil pan 22 by way of the inside of the generator chamber 65. A head side return oil passage 141 opened in the upper surface of the cylinder head 23 is provided in the cylinder head 23. A block side return oil passage 142 in communication with the head side return oil passage 141 is provided in the cylinder block 19 in such a manner as to be in communication with the inside of the generator chamber 65.

Figure 12:
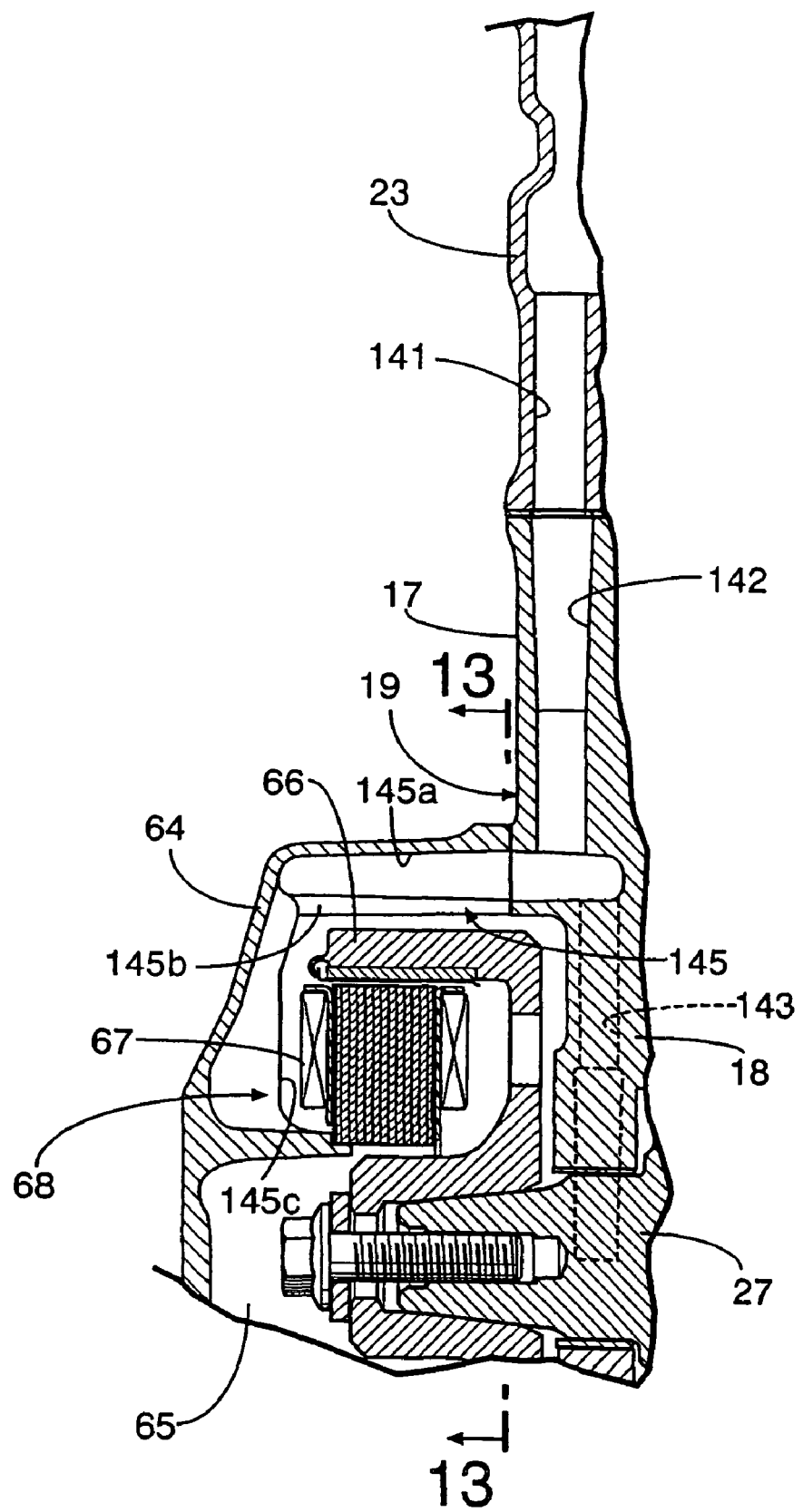
FIG. 12 is a cross-sectional view taken on line 12—12 of FIG. 11.

As particularly shown in FIG. 12, a branch oil passage 143 in communication with an intermediate portion of the block side return oil passage 142 is provided in the cylinder block 19. The branch oil passage 143 allows part of the oil flowing in the block side return oil passage 142 to bypass the generator chamber 65 and flow to the oil pan 22. The branch oil passage 143 is provided in the upper case portion 18 of the crankcase 21. A return oil passage 144 extending in the vertical direction is provided in the lower case 20 in such a manner that the upper end thereof is in communication with the branch oil passage 143 and the lower end thereof is opened in the oil pan 22.

The block side return oil passage 142 is opened into the connection face of the generator cover 64 with the cylinder block 19. A guide portion 145 for directing the oil from the block side return oil passage 142 to the stator 67 side of the generator 68 is formed in the generator cover 64.

Figure 13:
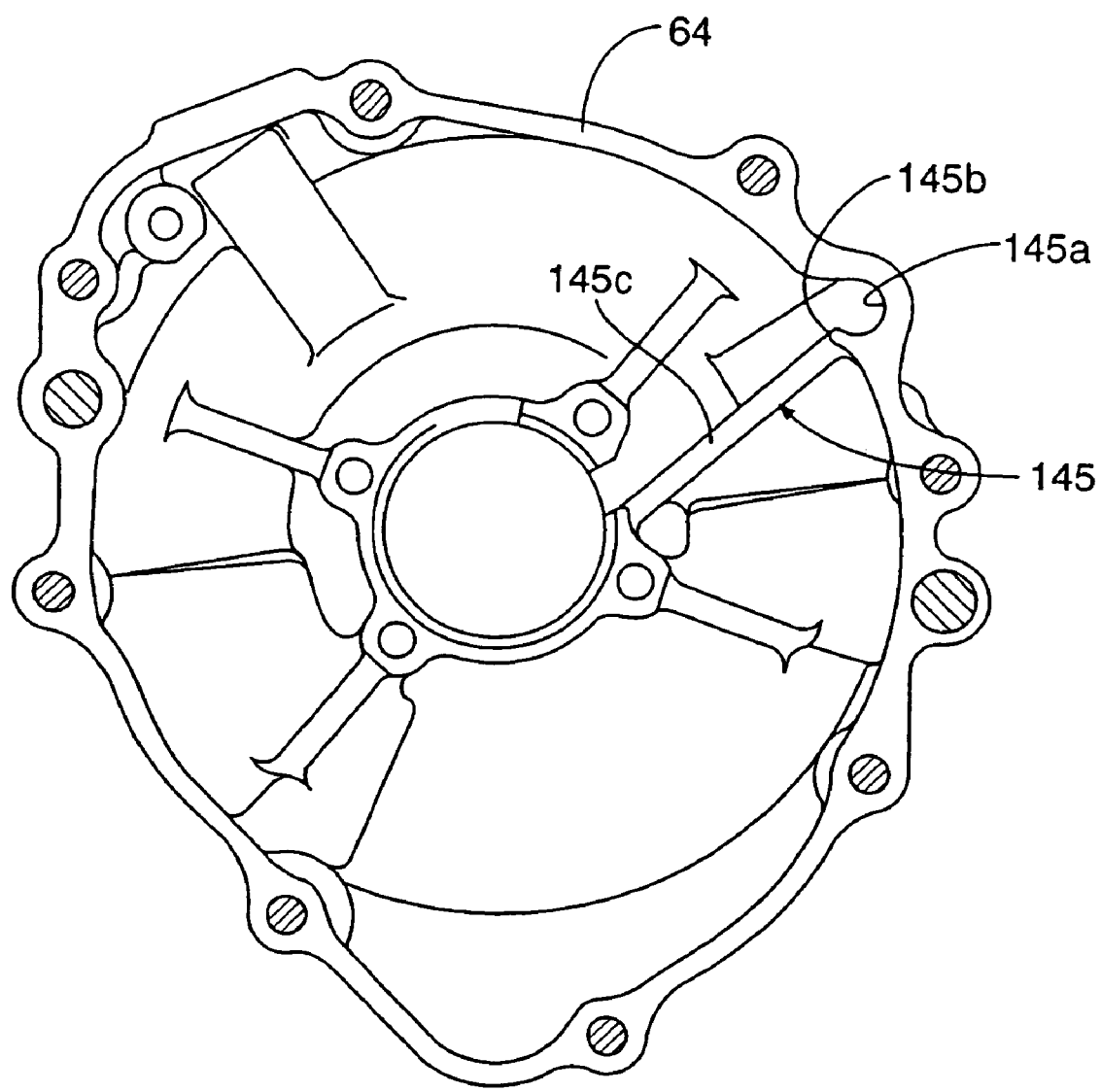
FIG. 13 is a view of a generator cover, in the direction of line 13—13 of FIG. 12.

As particularly shown in FIG. 13, the guide portion 145 includes a groove portion 145a, a gutter portion 145b, and a wall portion 145c. The groove portion 145a is provided in the inner side surface of the generator cover 64 with one end in communication with the block side return oil passage 142. The groove portion 145a extends to the closed end side of the generator cover 64. The gutter portion 145b is formed at the lower edge of the groove portion 145a. The wall portion 145c is provided on the closed end of the generator cover 64 in such a manner as to extend radially inwardly from the other end of the groove portion 145a.

The function of this embodiment will be described below. The generator 68 and the over-running clutch 29 are dividedly disposed at both ends of the crankshaft 27. This reduces the projecting amount of the engine body 15 on the generator 68 side, to allow the bank angle of the engine when the engine is mounted on a motorcycle to be set at a relatively large value. This also relatively reduces the projecting amount of the crankshaft 27 from the crankcase 21, to contribute to the improvement of the engine output due to the increased engine speed.

The starting motor 34 is disposed within an angle surrounded by the cylinder axis C of the engine body 15 and a straight line connecting the crankshaft 27 to the main shaft 37. More specifically, the starting motor 34 is mounted at an approximately central portion of the engine body 15 along the axis of the crankshaft 27. This prevents an unbalance in weight of the engine along the axis of the crankshaft 27 from being caused by mounting of the starting motor 34.

The over-running clutch 29 is mounted to one end portion of the crankshaft 27 at a position where the starting clutch 39 is sandwiched between the over-running clutch 29 and the starting motor 34 in the axial direction of the crankshaft 27. The starting gear reducer 35 is provided between the starting motor 34 and the over-running clutch 29. The starting gear reducer 35 includes the large-diameter gear 58 and the small-diameter gear 59 fixed to both ends of the rotational shaft 62. The rotational shaft 62 crosses the starting clutch 39, and is supported for rotation by the engine body 15. This allows the starting clutch 39, i.e., the main shaft 37 of the transmission 36 to be disposed at a relatively high position, and hence to make the transmission structure between the crankshaft 27 and the transmission 36 compact.

On a side view of the one end side of the crankshaft 27 in the axial direction, the starting motor 34 is disposed behind the starting clutch 38 in such a manner that part of the starting motor 34 is overlapped with the starting clutch 39. This allows the starting clutch 39, i.e., the main shaft 37 of the transmission 36 to be disposed at a relatively high position, and hence to make the transmission structure between the crankshaft 27 and the transmission 36 compact.

The main gallery 115 is connected to the discharge port of the oil pump 108 via the oil filer 116 and the oil cooler 118 is provided in the crankcase 21. The sub-gallery 117 is connected to the outlet 116b of the oil filer 116 in parallel to the main gallery 115 so as to introduce oil to the cylinder head 23 side. The sub-gallery 117 is provided in the crankcase 21.

The oil to be fed to the cylinder head 23 is led to the sub-gallery 117 in communication with the outlet 116b of the oil filter 116 in parallel to the main gallery 115. This makes it possible to divide oil into at least two parts and feed the divided parts of oil to portions to be lubricated of the engine, and hence to equally feed oil to each portion to be lubricated. This is effective to sufficiently feed oil to the cylinder head 23 without increasing a pressure loss of the oil. Another advantage is simplifying the passage configuration from the sub-gallery 117 to the cylinder head 23 by taking the sub-gallery 117 as a passage specialized to feed oil to the cylinder head 23.

The sub-gallery 117 includes the first passage portion 117a and the second passage portion 117b. The first passage portion 117a extends in straight line so as to communicate the outlet 116b of the oil filter 116 to the oil cooler 118. The second passage portion 117b extends in straight line in the direction reversed to that of the first passage portion 117a. This is advantageous in simplifying the shape of the sub-gallery 117, thereby facilitating the formation of the sub-gallery 117.

The sub-gallery 117 and the main gallery 115 in communication with the outlet 118b of the oil cooler 118 are provided in the crankcase 21 in such a manner that the axes thereof are parallel to the axis of the crankshaft 27. This is advantageous, in addition to the above-described simplification of the sub-gallery 117, in simplifying the shape of the main gallery 115, thereby facilitating the formation of the main gallery 115.

The center line of the sub-gallery 117, the center line of the main gallery 115, the center line of the communication passage 119 for communicating the outlet 118b of the oil cooler 118, and the center axes of the oil filter 116 and the oil cooler 118 are all located within the same plane. This facilitates the formation of the passages in the crankcase 21.

The discharge port 114 for connecting the oil pump 108 to the oil filter 116 is disposed under both the main gallery 115 and the sub-gallery 117 in such a manner that the axis thereof is perpendicular to the main gallery 115 and the sub-gallery 117. This allows the sub-gallery 117, the main gallery 115, and the discharge port 114 to be compactly disposed along the vertical direction.

The oil filter 116 and the oil cooler 118 are mounted on the outer wall surface of the crankcase 21 in such a manner as to be disposed in parallel. This allows the oil filter 116 and the oil cooler 118 to be compactly mounted to the crankcase 21 by making the distance between the axes of the oil filter 116 and the oil cooler 118 as short as possible.

Rotational power is transmitted from the crankshaft 27 to the intake side camshaft 79 and the exhaust side camshaft 80 by means of the timing transmission 85 having the cam chain 89. The screw lifter 94 having the lifter rod 103 with its one end being in contact with the tensioner arm 92, i.e. in sliding-contact with the cam chain 89 is provided in the cylinder head 23. The oil passage 126 to which oil is fed from the oil pump 108 is formed so as to extend around the cylinder head 23. The downstream end of the oil passage 126 is in communication with the screw type lifter 94.

With this configuration, it is possible to prevent the pressure of oil fed from the oil pump 108 to the oil passage 126 extending around the cylinder head 23 from being reduced in mid-flow, and hence to certainly feed oil to the screw type lifter 94 without increasing the discharged pressure of the oil pump 108. This is advantageous in preventing the engine from being enlarged due to enlargement of the oil pump 108.

The oil passage 126 extending around the cylinder head 23 is formed so as to pass through the sliding-contact portions between the intake side camshaft 79 and the exhaust side camshaft 80 and the cam journal wall 82 as one of the plurality of the cam journal walls 81 and 82 and the cam holder 84 fastened to the cam journal wall 82. This is effective to certainly lubricate the intake side camshaft 79 and the exhaust side camshaft 80.

The oil passage 126 extending around the cylinder head 23 includes the pair of annular grooves 128 and 134, the communication groove 135, and the pair of communication passages 127 and 136. The pair of annular grooves 128 and 134 are provided in the cam journal wall 82 and the cam holder 84 formed so as to rotatably support the intake side camshaft 79 and the exhaust side camshaft 80 in common. The annular grooves 128 and 134 are formed to surround the camshafts 79 and 80, respectively. The communication groove 135 is provided in at least one of the connection faces of the cam journal wall 82 and the cam holder 84 in the cylinder head 23 in such a manner as to connect the annular groove 128 to the annular groove 134. The pair of communication passages 127 and 136 are provided in a straight line in the cam journal wall 82 in such a manner as to be in communication with the annular grooves 128 and 134, respectively. With this configuration, of the oil passage 126 extending around the cylinder head 23, oil passage portions for lubricating the intake side camshaft 79 and the exhaust side camshaft 80 can be easily formed.

Oil is fed from the sub-gallery 117 independent from the main gallery 115 to the oil passage 126 extending around the cylinder head 23. This prevents the pressure of oil to be fed to the main gallery 115 from being affected by feeding of oil in the cylinder head 23.

To return oil from the cylinder head 23 to the oil pan 22 side through the generator chamber 65, the block side return oil passage 142 in communication with the head side return oil passage 141 provided in the cylinder head 23 is provided in the cylinder block 19 in such a manner as to be in communication with the inside of the generator chamber 65. The branch oil passage 143 in communication with the intermediate portion of the block side return oil passage 142 is provided in the cylinder block 19. The branch oil passage 143 is formed so as to allow part of oil flowing in the block side return oil passage 142 to bypass the generator chamber 65 and to flow to the oil pan 22 side.

Part of oil led to the block side return oil passage 142 through the head side return oil passage 141 is branched to the branch oil passage 143 side, to flow to the oil pan 22 side while bypassing the generator chamber 65. With this configuration, it is possible to suppress the amount of oil led in the generator chamber 65 to a suitable value, and hence comparatively reduce the agitating resistance of oil due to rotation of the rotor 66 of the generator 68. This is advantageous in preventing the oil temperature from being raised and the friction loss from being increased.

The branch oil passage 143 is provided in the upper case portion 18 of the lower side of the cylinder block 19. The return oil passage 144 with its upper end in communication with the branch oil passage 143 and its lower end opened in the oil pan 22 is provided in the lower case 20 forming the crankcase 21 in cooperation with the upper case portion 18 in such a manner as to extend in the vertical direction. Accordingly, the oil having flown in the branch oil passage 143 can be certainly led to the oil pan 22.

The guide portion 145 for leading the oil having led from the block side return oil passage 142 to the inside of the generator chamber 65 to the stator 67 side is provided on the inner surface of the generator cover 64. As a result, the oil having led in the generator chamber 65 can be used only for cooling the stator 67 by eliminating the contact of the oil with the rotor 66 as much as possible. This makes it possible to realize effective cooling and to effectively reduce the agitating resistance of oil due to rotation of the rotor 66.

While the embodiment of the present invention has been described, the present invention is not limited thereto, and it is to be understood that various changes in design may be made without departing from the scope of the present invention described in claims.

As described above, the first aspect of the present invention ensures that oil is properly fed to the screw type lifter, while preventing a reduction in pressure of oil fed to the cylinder head without the necessity of increasing the discharge pressure of the oil pump.

The second aspect of the present invention ensures that the camshafts are properly lubricated.

The third aspect of the present invention ensures that passage portions of the oil passage extending around the cylinder head are easily formed. The passage portions are used for lubricating the intake side and exhaust side camshafts.

The fourth aspect of the present invention prevents the pressure of the oil fed to the main gallery from being affected by the feeding of oil to the cylinder head.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil passage structure for an engine, the engine including:
    a tensioner arm provided in sliding-contact with a cam chain, the cam chain being adapted to reduce the speed of a crankshaft by half and transmit the resultant power to intake and exhaust camshafts of the engine for driving an intake valve and an exhaust valve of the engine;
    a screw type lifter having a lifter rod with one end in contact with the tensioner arm, the screw type lifter being provided in a cylinder head of the engine;
    an oil passage formed so as to extend around said cylinder head, oil discharged from an oil pump of the engine being fed through said oil passage,
    wherein the camshafts are rotatably supported by a plurality of cam journal walls provided in the cylinder head and a plurality of cam holders fastened to the plurality of cam journal walls, respectively,
    wherein said oil passage is formed in such a manner as to pass through sliding-contact portions between said camshafts and one of the plurality of cam journal walls and one of the plurality of cam holders,
    wherein said oil passage includes:
        a pair of annular grooves surrounding the camshafts, said annular grooves being provided in said one cam journal wall and said one cam holder;
        a communication groove for connecting said annular grooves to each other, said communication groove being provided in at least one of joining faces of said one cam journal wall and said one cam holder in said cylinder head; and
        a pair of communication passages provided in a straight line in said one cam journal wall in such a manner as to be in communication with said annular grooves, respectively,
    wherein a downstream end of said oil passage is in communication with the screw type lifter.

2. The oil passage structure for an engine according to claim 1, wherein a sub-gallery is provided in a crankcase of the engine in such a manner as to be independent from a main-gallery, said sub-gallery for leading the oil from the oil pump to the oil passage extending around the cylinder head, and said main gallery for leading the oil from the oil pump to portions to be lubricated at least in the crankshaft.

3. An oil passage structure for an engine according to claim 1, wherein the oil passage extends from the oil pump to the exhaust side camshaft, to the intake camshaft, and then to the screw type lifter of the engine.

4. An oil passage structure for an engine, comprising:
    a cylinder head of the engine;
    a screw type lifter of the engine, the screw type lifter having a housing mounted on the cylinder head; and
    an oil passage formed so as to extend around said cylinder head, oil discharged from an oil pump of the engine being fed through said oil passage,
    wherein the oil passage extends from the oil pump to an exhaust side camshaft, to an intake camshaft, and then extends outward through the cylinder head and continues in a straight line into a passage formed in the housing of the screw type lifter of the engine,
    the passage in the screw type lifter extending from a flange portion of the housing, running at an acute angle with respect to a shaft of the lifter, and ending at an outer end of the shaft of the lifter,
    wherein a downstream end of said oil passage is in communication with the screw type lifter of the engine.

5. The oil passage structure for an engine according to claim 4, wherein camshafts of the engine are rotatably supported by a plurality of cam journal walls provided in the cylinder head and a plurality cam holders fastened to the plurality of cam journal walls, respectively,
    wherein said oil passage is formed in such a manner as to pass through sliding-contact portions between said camshafts and one of the plurality of cam journal walls and one of the plurality of cam holders.

6. The oil passage structure for an engine according to claim 5, wherein said oil passage comprises:
    a pair of annular grooves surrounding the camshafts, said annular grooves being provided in said one cam journal wall and said one cam holder formed;
    a communication groove for connecting said annular grooves to each other, said communication groove being provided in at least one of joining faces of said one cam journal wall and said one cam holder in said cylinder head; and a pair of communication passages provided in a straight line in said one cam journal wall in such a manner as to be in communication with said annular grooves, respectively.

7. The oil passage structure for an engine according to claim 5, wherein a sub-gallery is provided in a crankcase of the engine in such a manner as to be independent from a main-gallery, said sub-gallery for leading the oil from the oil pump to the oil passage extending around the cylinder head, and said main gallery for leading the oil from the oil pump to portions to be lubricated at least in the crankshaft.

8. The oil passage structure for an engine according to claim 6, wherein a sub-gallery is provided in a crankcase of the engine in such a manner as to be independent from a main-gallery, said sub-gallery for leading the oil from the oil pump to the oil passage extending around the cylinder head, and said main gallery for leading the oil from the oil pump to portions to be lubricated at least in the crankshaft.

9. The oil passage structure for an engine according to claim 4, wherein a sub-gallery is provided in a crankcase of the engine in such a manner as to be independent from a main-gallery, said sub-gallery for leading the oil from the oil pump to the oil passage extending around the cylinder head, and said main gallery for leading the oil from the oil pump to portions to be lubricated at least in the crankshaft.

10. An oil passage structure for an engine according to claim 4, wherein the oil passage extends from the oil pump to the exhaust side camshaft, to the intake camshaft, and then to the screw type lifter of the engine.

11. An oil passage structure for an engine, comprising:
a cylinder head of the engine;
a screw type lifter of the engine, the screw type lifter having a housing mounted on the cylinder head; and
an oil passage formed so as to extend around said cylinder head, oil discharged from an oil pump of the engine being fed through said oil passage,
wherein the oil passage extends from the oil pump to an exhaust side camshaft to an intake camshaft, and then extends outward through the cylinder head and continues in a straight line into a passage formed in the housing of the screw type lifter of the engine,
the passage in the screw type lifter extending from a flange portion of the housing, running at an acute angel with respect to a shaft of the lifter, and extending at an outer end of the shaft of the lifter.

12. An oil passage structure for an engine according to claim 11, wherein an upward end of the oil passage is in communication with an exhaust side camshaft and a downward end of the oil passage is in communication with the passage in the screw type lifter.

13. An oil passage structure for an engine according to claim 12, wherein the upward end of the oil passage extends in a direction that is parallel to a direction of the downward end of the oil passage.

14. The oil passage structure for an engine according to claim 11, wherein the camshafts are rotatably supported by a plurality of cam journal walls provided in the cylinder head and a plurality of cam holders fastened to the plurality of cam journal walls, respectively, and
wherein said oil passage is formed in such a manner as to pass through sliding-contact portions between said camshafts and one of the plurality of cam journal walls and one of the plurality of cam holders.

15. The oil passage structure for an engine according to claim 14, wherein said oil passage comprises:
a pair of annular grooves surrounding the camshafts, said annular grooves being provided in said one cam journal wall and said one cam holder;
a communication groove for connecting said annular grooves to each other, said communication groove being provided in at least one of joining faces of said one cam journal wall and said one cam holder to said cylinder head; and
a pair of communication passages provided in a straight line in said one cam journal wall in such a manner as to be in communication with said annular grooves, respectively.

16. An oil passage structure for an engine, comprising:
a tensioner arm provided in sliding-contact with a cam chain, the cam chain being adapted to reduce the speed of a crankshaft by half and transmit the resultant power to intake and exhaust camshafts of the engine for driving an intake valve and an exhaust valve of the engine;
a lifter having a lifter rod with one end in contact with the tensioner arm, the lifter being provided in a cylinder head of the engine; and
an oil passage formed so as to extend around said cylinder head, oil discharged from an oil pump of the engine being fed through said oil passage.
wherein the camshafts are rotatably supported by a plurality of cam journal walls provided in the cylinder head and a plurality of cam holders fastened to the plurality of cam journal walls, respectively,
wherein said oil passage is formed in such a manner as to pass through a contact portion between one of the plurality of cam journal walls of the cylinder head and one of the plurality of cam holders, said oil passage also passing through sliding-contact portions between said camshafts and one of the plurality of cam journal walls and/or one of the plurality of cam holders, and
wherein a downstream end of the oil passage is in communications with the lifter.

* * * * *